July 2, 1963  V. R. HALLENBECK  3,096,117
VEHICLE BODY
Filed March 8, 1961  4 Sheets-Sheet 1

INVENTOR.
Virgil R. Hallenbeck
BY
Herbert Furman
ATTORNEY

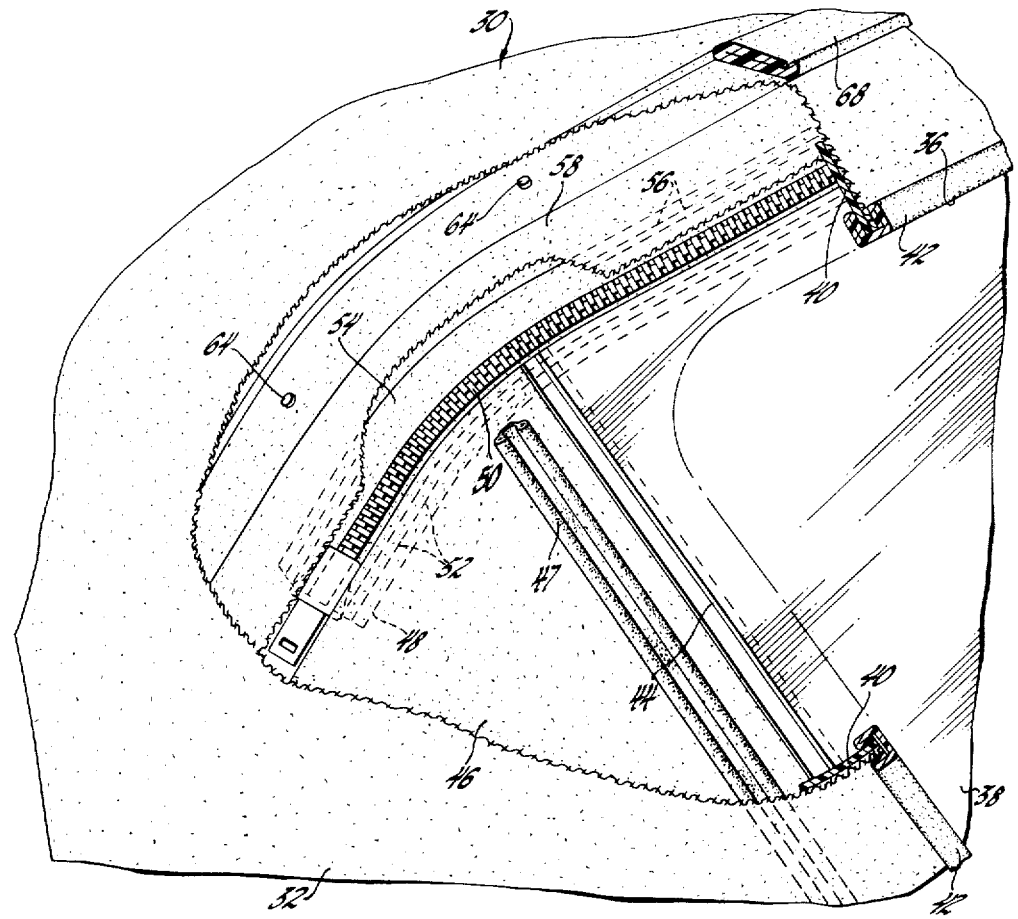

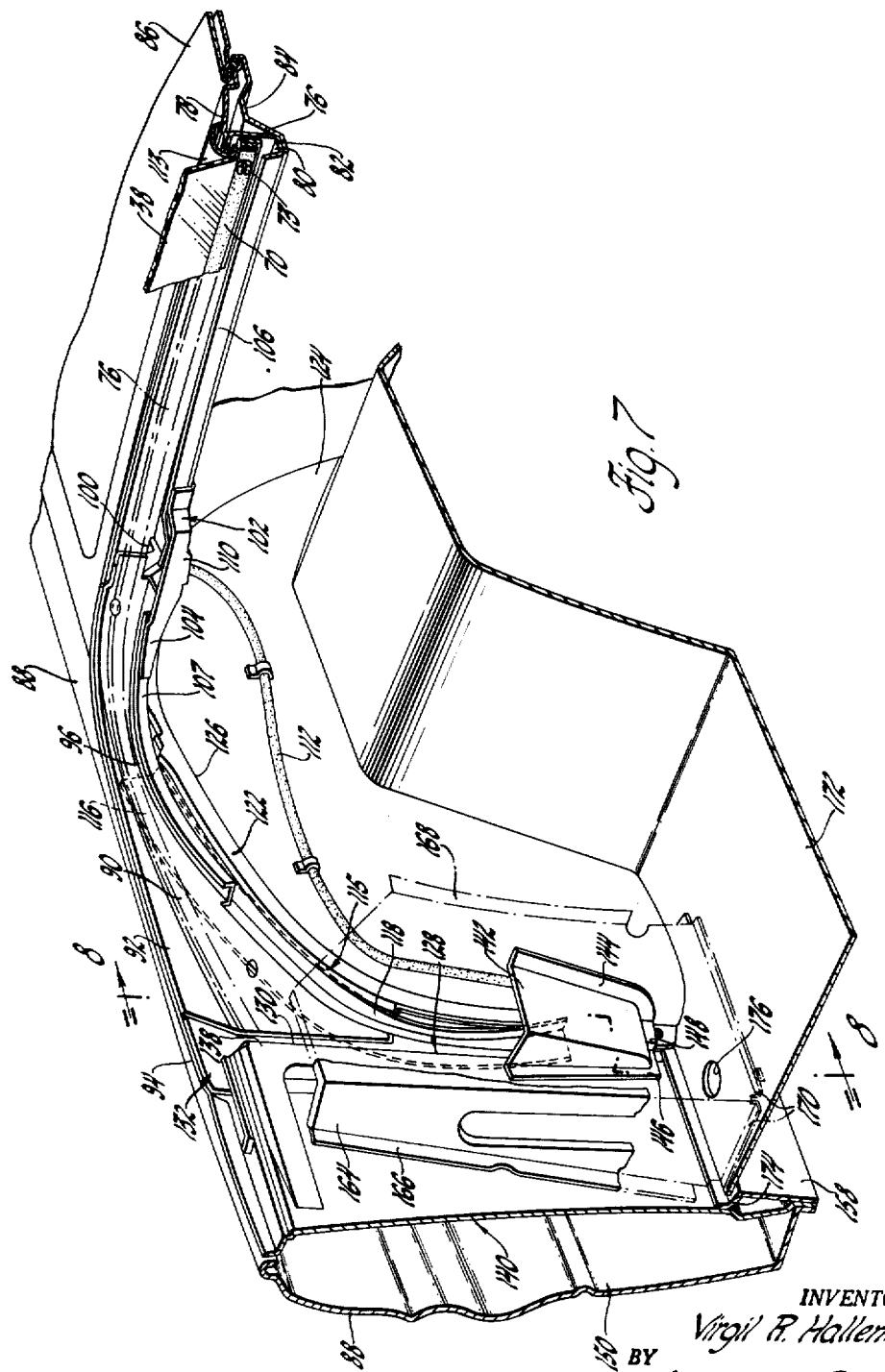

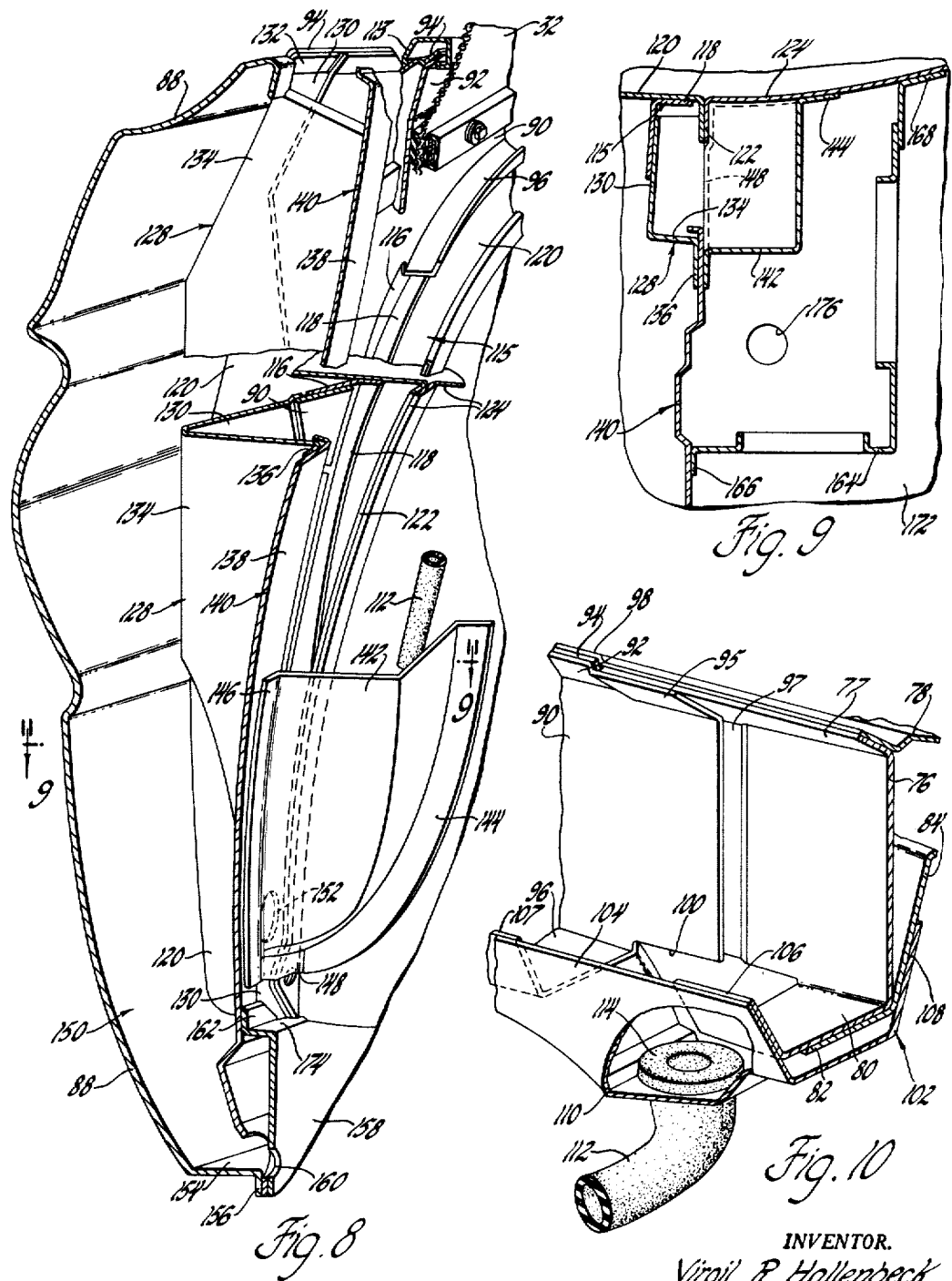

United States Patent Office 3,096,117
Patented July 2, 1963

3,096,117
VEHICLE BODY
Virgil R. Hallenbeck, Royal Oak, Mich., assignor to General Motors Corporation, Detroit, Mich., a corporation of Delaware
Filed Mar. 8, 1961, Ser. No. 94,204
3 Claims. (Cl. 296—107)

This invention relates to vehicle bodies and more particularly to a rear window structure for convertible vehicle bodies.

The usual convertible vehicle body includes a foldable top frame which supports a top fabric. The top fabric is provided with a rear window opening which is opened and closed by a rear window structure.

At the present time such rear window structures include a flexible window member of plastic material which is fixedly secured to the top fabric at its lower edge and is removably secured to the top fabric at its side and upper edges by a zipper. The zipper tapes are usually stitched to both the window and to the top fabric and various sealing provisions are provided for the tapes and for the stitching. Since the zipper must pass around the two generally right angular upper corners of the window, difficulty is often experienced in both zipping and unzipping the window from the top fabric. Additionally, since the zipper is rather inflexible and the window is not stretchable, the top frame usually cannot be lowered with the window in a closed position due to tension in the rear quarter areas of the top fabric. This requires that the driver or passenger first unzip the window before the top frame is lowered and thereafter zip the window to the top fabric after the top frame has been raised.

This invention obviates the difficulties of present rear window structures and is also of very simple and economical construction. Additionally, the rear window structure of this invention allows the convertible top frame to be raised or lowered at will regardless of the position of the rear window. Further, the rear window structure of this invention lessens the possibility of water leakage into the interior of the body by doing away with all stitching between exteriorly exposed parts of the top fabric and the rear window. Additionally, the rear window structure of this invention provides a much easier operating zipper since the zipper does not have to pass around any sharp corners but follows a generally linear path.

These and other advantages of the subject structure will be readily apparent from the following specification and drawings wherein:

FIGURE 5 is an enlarged partially broken away view of a portion of FIGURE 1;

FIGURE 6 is an enlarged partially broken away view of a portion of FIGURE 5;

FIGURE 7 is a partially broken away perspective view of a portion of a convertible vehicle body showing the drainage means for the convertible top;

FIGURE 8 is an enlarged view taken generally along the plane indicated by line 8—8 of FIGURE 7;

FIGURE 9 is an enlarged sectional view taken generally along the plane indicated by line 9—9 of FIGURE 8; and FIGURE 10 is an enlarged partially broken away view of a portion of FIGURE 7.

Figure 1:
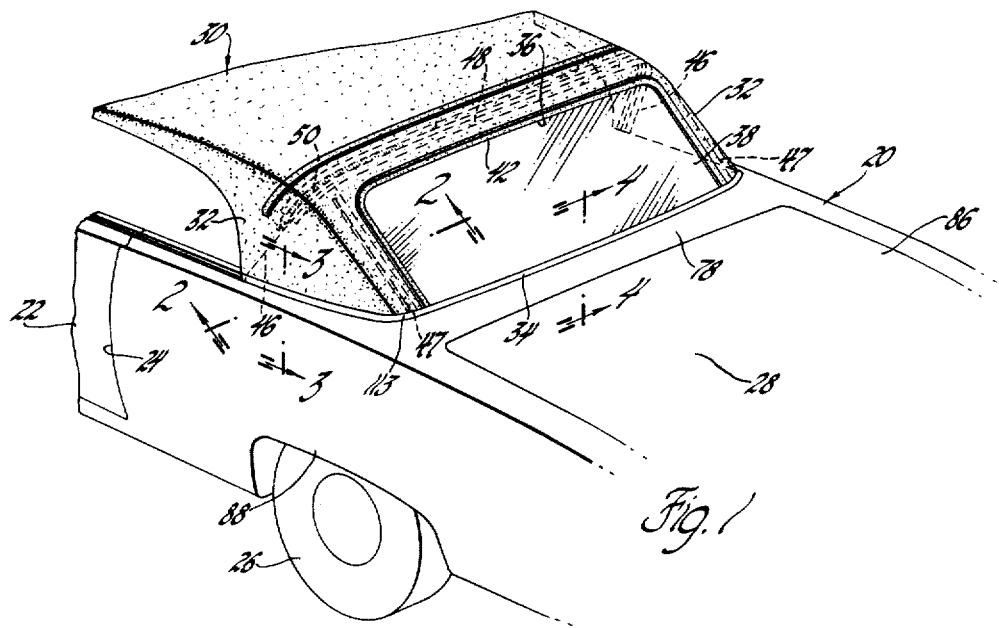
FIGURE 1 is a perspective view of a portion of a convertible vehicle body embodying a rear window structure according to this invention.

Referring now particularly to FIGURE 1 of the drawings, a convertible vehicle body 20 generally includes front doors 22 which are suitably hinged at their forward edges to the body 20 and suitably latched at their rearward edges 24 thereto, a pair of rear road wheels 26, a rear deck 28, and a top fabric 30 which provides the upper portion of the body 20 and is supported thereon by a convertible top frame of known type. The top frame is of a type which may be raised and lowered with respect to body 20 and the details thereof form no part of this invention and are accordingly not shown. Examples of suitable top frames may be found by reference to U.S. Patents 2,930,651 Lautenbach et al., and 2,897,003 Lelli et al. However, it will be noted that such top frame must include a rear bow or No. 3 bow which is raised and lowered with the top frame, although this bow may be supported on the top frame itself or on the body.

The rear quarter areas or portions 32 of the top fabric extend upwardly from the belt line 34 of body 20 and define a generally U-shaped rear window opening 36 with the upperm portion of the top fabric. Opening 36 is opened and closed by a rear window 38, preferably of clear plastic material so as to provide rearward vision for the driver when the window is in a closed position, as shown.

Figure 2:
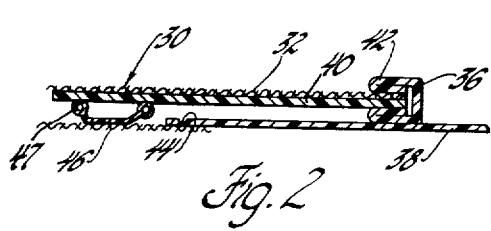
FIGURE 2 is an enlarged sectional view taken generally along the plane indicated by line 2—2 of FIGURE 1.

As best shown in FIGURES 2, 5 and 6 of the drawings, the top fabric is reinforced around opening 36 by a U-shaped rubber or plastic strip 40 cemented thereto, with the adjacent edges of the top fabric and the strip 40 being finished by a U-shaped flexible decorative plastic molding 42 which defines opening 36. The lower edge portion of the window 38 is secured to the body 30 immediately below the belt line 34 in a manner to be hereinafter described. As best shown in FIGURES 1, 2 and 5 of the drawings, the side edge portions of the window 38 extend inwardly of the side edge portions of the opening 36, or outwardly to each side of the body 20, with each side edge portion of the window 38 being secured at 44 to the rear edge portion of generally triangularly shaped fabric members 46. In the specific example shown, the securing means 44 comprises a dielectrically bonded seam between the side edge portions of the window 38 and the members 46. By providing a seam of this type, a weather-tight and waterproof seal is ensured across the entire rear upper portion of the body since no ambient material can enter the body between the window 38 and the members 46. As indicated in FIGURE 2, molding 42 bears against the window 38 to provide a neat exterior appearance to the body 20. The lower edge portions of the fabric members 46 are secured to the body 20 immediately below the belt line 34 in a manner to be hereinafter described. As shown in FIGURES 1, 2 and 5, U-shaped dam members 47 have their bases secured to members 46 as by cementing or dielectric bonding, and include tubular leg end portions bearing against the top fabric 30.

As best shown in FIGURES 5 and 6 of the drawings, a zipper tape 48 or zipper 50 is stitched at 52 to the upper edge portion of the window 38 and to each of the fabric members 46. As indicated in FIGURE 1, the tape 48 extends entirely along the forward edge portion of the right hand fabric member 46, along the entire upper edge portion of the window 38, and only partially along the forward edge portion of the left hand fabric member 46, as also indicated in FIGURE 5. The other tape 54 of the zipper is stitched at 56 to the edge portion of a fabric strip 58 which in turn is secured to the rear or No. 3 bow 60 of the top frame. As previously mentioned, a known type top frame may be used with the subject rear window structure, provided that the frame includes a rear or No. 3 bow which may either be mounted on the top frame or mounted on the body. It will be noted, with reference to FIGURE 6, that bow 60 includes an inserted tacking strip 62 and that the fabric strip 58 is tacked thereto at 64 in order to secure this strip to the bow. The top fabric 30 is also secured to the tacking strip 58 in the area thereof between the seams 44 by tacks 66 which are concealed by a finishing strip 68.

From the foregoing description, it can be seen that when the top fabric 30 is in a raised position, the exterior thereof presents a very neat appearance with no exposed stitching or seams. Further, it will be noted that it is impossible for water to enter the rear area of the body from between the window 38 and the fabric members 46. Inasmuch as the zipper 50 follows the contour of the bow 54, the zipper both zips and unzips generally linearly so that it is very easy for the operator to both open and close the rear window opening 36 of the top fabric 30. It will be remembered that one of the advantages of the subject rear window structure is that the top frame and top fabric can be raised and lowered regardless whether the rear window 38 is in an open or closed position. From the foregoing description, it will be noted that there is no connection between the rear quarter portions 32 of the top fabric and either the window 38 or the fabric members 46 above the belt line 34 of the body. Thus, the only connection above the belt line between the top fabric 30, window 38, and the fabric members 46 is by means of the rear or No. 3 bow 60. Accordingly, when the top frame is raised and lowered, any tension in the rear quarter portions or areas 32 of the top fabric cannot be transferred to or affected by the window 38. Thus, the window 38 does not have to be moved to an open position prior to each time that the top frame and top fabric 30 are raised and lowered.

The portions 32 of the top fabric 30, the fabric members 46, and the rear window 38 are secured to the body immediately below the belt line 34 thereof in a conventional and well known manner. As can be seen from FIGURES 3, 4, 7 and 8, a generally U-shaped trim stick 70 extends entirely around the rear generally U-shaped portion of the body opening immediately below the belt line 34 and is secured by tacking or otherwise to the lower edges of the portions 32 of the top and the members 46 and to the lower edge of the window 38. The trim stick 70 is provided with enlarged apertures 72, FIGURES 3 and 4, and a sheet metal screw 73 extends through each aperture 72 and through a rectangularly-shaped rubber washer 74 and is threaded into the body sheet metal. The rubber washers 74 space the trim stick 70 from the body sheet metal and define drain passages therebetween.

Across the rear portion of the body, the sheet metal screws 73 are threaded into an inner body panel member 76 of generally C-shaped cross section. The upper flanged end 77 of member 76 is secured to an outer body panel member 78 which is part of the rear deck area 28 of body 20. The lower portion of the member 74 defines a gutter or trough 80 and the base of this trough is secured to a flanged end 82 of a body reinforcing member 84. Members 78 and 84 have their rearward edge portions secured together to define a trough which receives and mounts the weatherstrip for the deck lid 86 of the body, FIGURE 7.

Member 78 merges into the outer rear quarter panels 88 of the body. As best shown in FIGURES 7 and 8, an inner body panel member 90 has an upper flanged edge portion 92 which is secured to a flange 94 of panel 88. Member 90 extends rearwardly and partially around the rear quarter corners of the body, with the lower portion of member 90 being formed into a gutter or trough 96. As best shown in FIGURE 10 of the drawings, the portion 92 of member 90 is offset at 95 to receive the flanged end 77 of member 76, with a portion 97 of member 76 overlying member 90. An offset portion 98 of member 78 overlies and is secured to the members 76 and 90. It will be noted that a portion of the troughs 96 and 80 are cut away to define an opening 100. A generally channel cross section gutter member 102 has the base thereof welded to the bases of troughs 96 and 80, the leg 104 thereof secured to the legs 106 and 107 of the troughs 80 and 96, respectively, and the leg 108 thereof secured to member 84. The center portion of the base of member 102 is offset and depressed to form a catch basin 110, and a hose 112 has the headed end 114 thereof snapped within a suitable opening in the catch basin 110.

Figure 4:
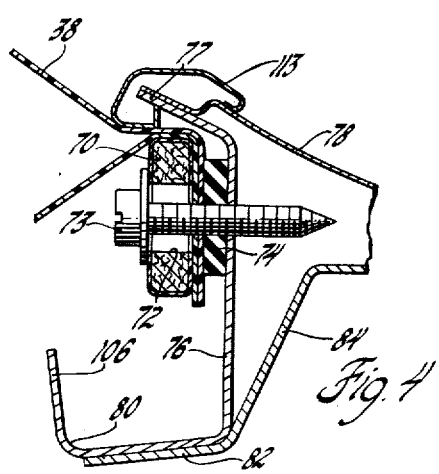
FIGURE 4 is an enlarged sectional view taken generally along the plane indicated by line 4—4 of FIGURE 1.
Figure 3:
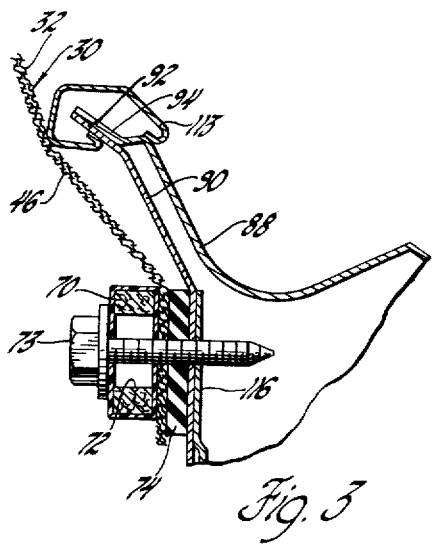
FIGURE 3 is an enlarged sectional view taken generally along the plane indicated by line 3—3 of FIGURE 1.

A snap-on finish molding 113 fits over the upper end of member 78, the flanged end 77 of member 76, the flanged edge portion 92 of member 90 and the flange 94 of member 88, FIGURES 1, 3, and 4, to prevent the top fabric 30 and window 38 from being cut and to also tension the top fabric and the window against the trim stick 70.

The trough 96 terminates rearwardly of the forward edge of the member 90, as shown in FIGURE 7, with this trough being continued forwardly and downwardly of the body by a trough or gutter 115. Gutter 115 is formed by a generally L-shaped member 116, by the member 120, and by the pinchweld 122 between member 120 and the inner wheel house member 124. Member 116 has the flange 118 thereof welded to the outer wheel house member 120 and follows the member 120 to approximately the crown point 126 of the wheel house members, FIGURE 7, and is welded to member 90. The screws 73 which secure the tacking strip 70 to the body extend through the members 90 and 116 along the sides of the body.

An angular rear quarter rear inner panel member 128 has the offset lateral wall 130 thereof overlapped by and secured to the forward edge portion of the member 90, secured to the member 116 below the forward edge portion of the member 90, and secured to the pinchweld 122 below the member 116, FIGURES 7, 8 and 9. The flange 132 of the member 128 is secured to the flange 94 of member 88 to carry the body pinchweld forwardly of the body. A lateral wall 134 of the member 128 extends inwardly of the body, and the flanged edge 136 thereof is secured to the rearward flanged edge portion 138 of the rear quarter front inner panel member 140.

A catch basin 142 includes a rear flanged edge 144 welded to the inner wheel house member 124, a forward flanged edge 146 welded to the member 140, and a lower flanged edge 148 welded to pinchweld 122 and wall 130 of member 128. A catch basin 142 empties into the well 150 between the panel members 88 and 140 through drain opening 152 in the wall 130 of member 128 adjacent the lower wall of the basin 142. The lower wall 154 of member 150 terminates in a flanged edge 156 which is joined to the lower edge of the panel member 140 and the lower edge of a rocker inner panel member 158 to provide a pinchweld structure. A drain opening 160 in members 140 and 158 allows the water which drains into the well 150 to drain exteriorly of the body. The upper flanged edge 162 of member 158 is joined to the member 140.

As indicated partially schematically in FIGURE 7, an angular stanchion or support member 164 extends between the panel member 140 and the inner wheel house member 124 and includes a forward flanged edge 166 secured to the former and a rear flanged edge 168 secured to the latter. Member 164 provides the support for the top frame of the convertible top as is well known. The lower flanged edges 170 of the member 164 are secured to the floor 172. The outer edge of the floor pan rests on a flange portion or ledge 174 of the member 158 and is secured thereto. As best shown in FIGURE 7, a drain opening 176 is provided in the floor pan 172 within the confines of the member 164.

It will be remembered that the rubber washers or spacer blocks 74 space the trim stick from the body sheet metal whereby drain passages are provided between the outer surface of the top fabric 32 and the window 38 and the inner surface of the body sheet metal. The water which enters the body along the window 38 will be collected in the gutter 80 and will thereupon pass to the catch basins 104 so as to be drained to the exterior of the body through the hoses 112, the catch basins 142 and the openings 152 and 160. Likewise, the water which enters the body along the rear quarter areas 32 of the top fabric will be drained exteriorly of the body through the gutters 96 and 115. The water which collects in the one portion of the gutters 96 forwardly of the crown points 126 of the wheel house members will pass to the catch basins 104 and will thereupon be drained exteriorly of the body through the hoses 112 as previously described. The water which is collected in the other portion of the gutters 96 and the gutters 115 will be drained directly into the catch basin 142 and will thereupon be similarly drained exteriorly of the body.

In the event that the catch basin 142 becomes clogged or overflows or in the event that water enters the body and bypasses the catch basin 142, this water will be collected within the confines of the support members 164 and will be drained exteriorly of the body through the openings 176. Thus, it is virtually impossible for any water to be collected within the body and not drained exteriorly thereof. The openings 176 and 160 may be closed, if desired, by conventional flap-type dust and drain valves.

I claim:

1. In a convertible vehicle body of the type including a foldable top frame mounted thereon for movement between raised and lowered positions and supporting a flexible top fabric having a rear window opening therein, a rear window construction comprising, in combination, a rear window of flexible material having an extent greater than the extent of said rear window opening, said window being disposed underneath said top fabric to locate the edge portions of said top fabric around said opening in overlying relationship to said window, means securing the lower edge portion of said window to the interior of said body below the belt line thereof and below said window opening, means securing the side edge portions of said window to the interior of said body below the belt line thereof and to each side of said rear window opening, means removably securing the upper edge portion of said window to said top frame above said window opening and below the edge portion of said top fabric overlying the upper edge portion of said window, each said securing means lacking any connection to said top fabric whereby the tension and stress in said top fabric cannot be transferred to said rear window and said rear window and top fabric can shift relative to each other when said top frame is raised and lowered.

2. In a convertible vehicle body of the type including a foldable top frame mounted thereon for movement between raised and lowered positions and supporting a flexible top fabric having a rear window opening therein, a rear window construction comprising, in combination, a rear window unit including a rear window of flexible material having an extent greater than the extent of said rear window opening and a pair of flexible fabric members, each being secured to one side edge portion of said window, means securing the lower edge portion of said window to the interior of said body below the belt line thereof and below said window opening, means securing an edge portion of each of said fabric members to the interior of said body below the belt line thereof at each side of said window opening, and releasable means securing the upper edge portion of said window to said top frame above said window opening, said window and said fabric members being foldable inwardly of said body independently of said top fabric about the lower edge portion of said window and the edge portions of said fabric members secured to said body upon release of said releasable means.

3. In a convertible vehicle body of the type including a foldable top frame mounted thereon for movement between raised and lowered positions and supporting a flexible top fabric having a rear window opening therein, a rear window construction comprising, in combination, a rear window unit including a rear window of flexible material having an extent greater than the extent of said rear window opening and a pair of flexible fabric members, each being secured to one side edge portion of said window, means securing the lower edge portion of said window to the interior of said body below the belt line thereof and below said window opening, means securing an edge portion of each of said fabric members to the interior of said body below the belt line thereof at each side of said window opening, releasable means securing the upper edge portion of said window to said top frame above said window opening, and sealing means on each of said fabric members to seal said fabric members to said top fabric to each side of said window opening, said window and said fabric members being foldable inwardly of said body about the lower edge portion of said window and the edge portions of said fabric members secured to said body upon release of said releasable means.

References Cited in the file of this patent

UNITED STATES PATENTS

| | | |
|---|---|---|
| 1,637,812 | Ferguson | Aug. 2, 1927 |
| 1,809,505 | Campbell | June 9, 1931 |
| 2,981,564 | Lieberman et al. | Apr. 25, 1961 |

UNITED STATES PATENT OFFICE
CERTIFICATE OF CORRECTION

Patent No. 3,096,117                                                  July 2, 1963

Virgil R. Hallenbeck

It is hereby certified that error appears in the above numbered patent requiring correction and that the said Letters Patent should read as corrected below.

Column 2, line 60, for "or" read -- of --; column 6, line 35, strike out "of each".

Signed and sealed this 31st day of December 1963.

(SEAL)
Attest:
ERNEST W. SWIDER

Attesting Officer

EDWIN L. REYNOLDS

Acting Commissioner of Patents